Oct. 2, 1956  J. H. BULL  2,765,088
VEHICLE UNLOADER
Filed Aug. 16, 1954  2 Sheets-Sheet 2

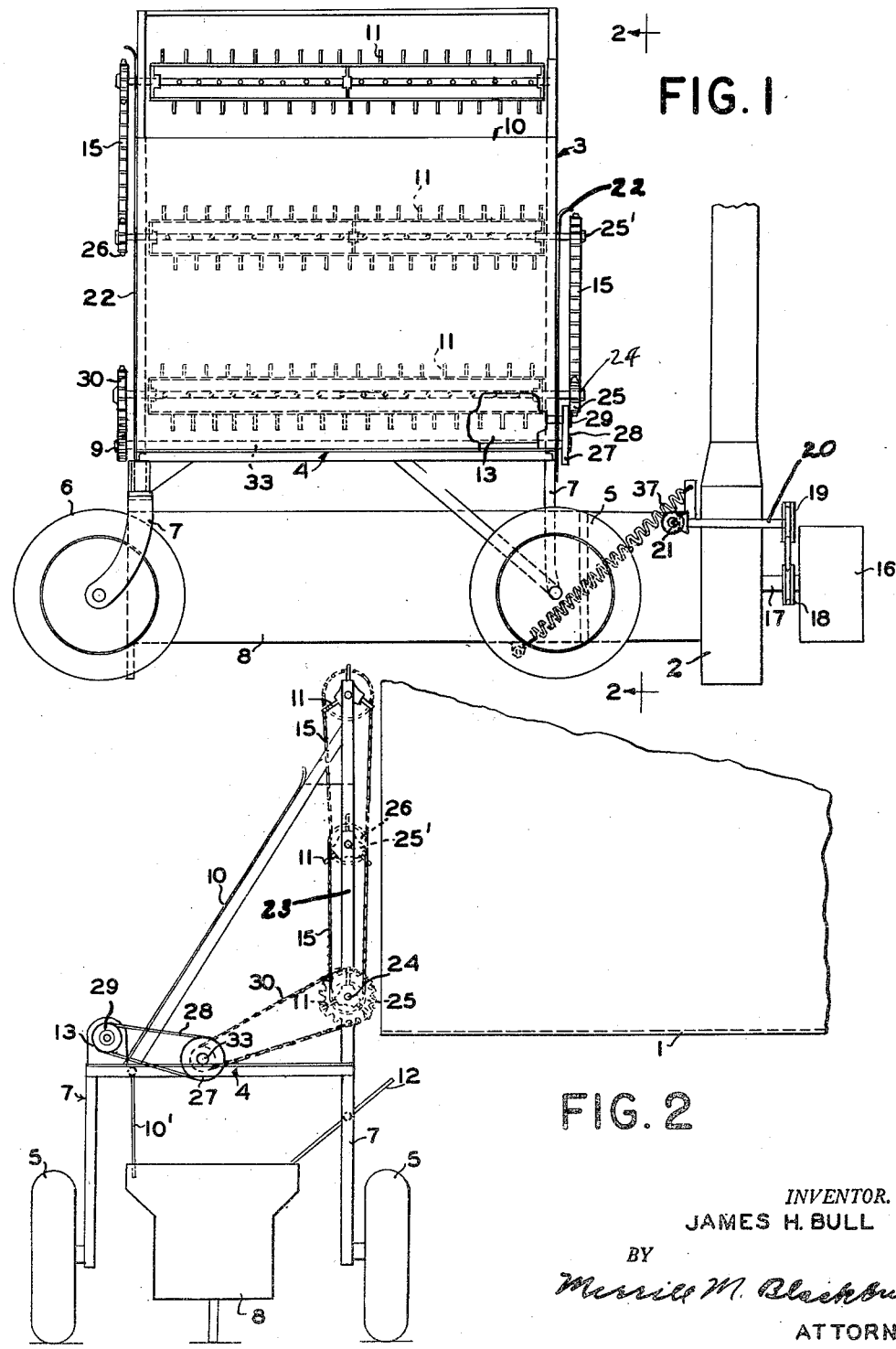

INVENTOR.
JAMES H. BULL
BY Merrill M. Blackburn.
ATTORNEY

United States Patent Office 2,765,088
Patented Oct. 2, 1956

2,765,088

VEHICLE UNLOADER

James H. Bull, near Clinton, Iowa

Application August 16, 1954, Serial No. 449,860

4 Claims. (Cl. 214—44)

The present invention relates to a vehicle unloader of the type in which chopped hay or other cut-up vegetation may be fed from a wagon or truck to a power-operated blower. The present construction is provided with wheels on which the unloader may be moved from place to place and may be readily adjusted relative to a wagon or truck and a blower or elevator of well known construction.

In the drawings annexed hereto and forming a part hereof,

Fig. 1 is a rear view of the present construction set up in usable form;

Fig. 2 is an end view of the construction shown in Fig. 1, without the blower;

Figure 3:
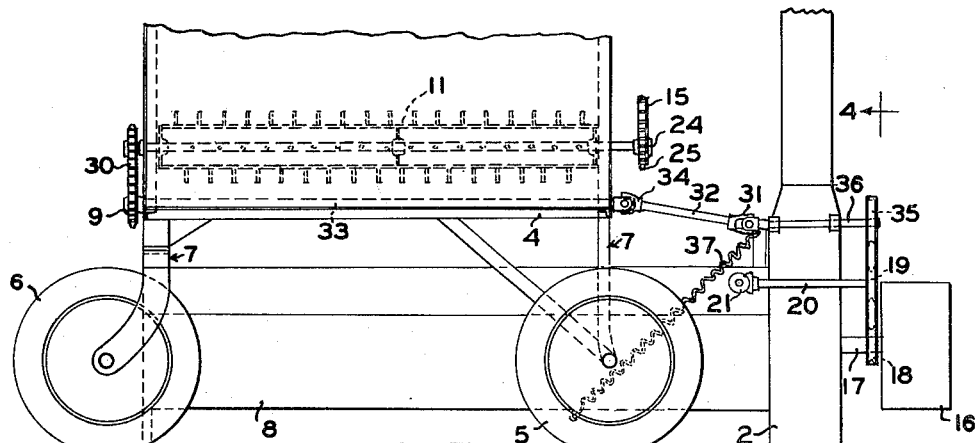
Fig. 3 is a modification of the structure shown in Fig. 1.

Reference will now be made in greater detail to the annexed drawings for a more complete description of this invention. The body of the truck or wagon is shown at 1 and the blower at 2. These two elements are old and well known and may be of any approved type. There is also the portable unloader 3, structurally independent of the vehicle 1 and blower 2 and which constitutes the subject matter of this application. It comprises the wheeled carrier in the form of a substantially horizontal open framework 4, carried by the four wheels 5 and 6 mounted on supports or legs 7. Preferably the two wheels 6 at one end of the carrier 4 are casters to make it easier to wheel this unit into place adjacent the discharge end of the body 1 of the truck or wagon and astride a conveyor hopper 8 of the blower 2.

The conveyor hopper 8 is conventionally pivotally attached to the blower 2 and can be raised when the unloader unit 3 is not placed over the conveyor 8. When the wagon or truck is unloaded, it may be driven away, the unloader moved out of place, and the conveyor lifted up so that another load can be driven into place. A top shield 10 is mounted on and includes brace means and keeps rotary feeder units 11 from throwing the crops or cut vegetation over the top of the conveyor 8. A shield 10¹ depends pivotally from the shield 10 and hangs into the hopper 8. A guard or deector 12, attached to one side of the wheeled carrier 4, prevents cut vegetation from dropping down at the open discharge end of the wagon or truck body 1, the rear or terminal edge of the floor of which is, as shown, adjacent to but at a level above the near edge of the hopper 8. The guard 12 is a part of the wheeled carrier 4. The rotary units 11 are crop-engaging means carried by upright support means 23 secured to and raising from the framework 4 in a plane between the rear of the vehicle and the near edge of the hopper 8.

A motor 13, representative of power transmitting means, is mounted on the bed of the wheeled carrier framework 4 to operate the rotary feeder units 11, to keep the cut vegetation from clogging the discharge from the body 1 of the wagon or truck. Preferably, the three rotary feeder units 11 run at different speeds, the upper one running the slowest and the lowest one running the fastest. Hence, it will be obvious that, with the endgate opened, the rotary feeder units 11 will engage and scratch the cut vegetation from the end of the vehicle load and through the open framework 4 and into the conveyor, which may have, in its bottom, an auger or a slat conveyor (not shown) to feed the cut vegetation to the blower.

A blower fan (not shown) is conventionally driven by a flat-belt pulley 16 mounted on a shaft 17, and this shaft 17 carries a V-belt pulley 18 which is belted to a pulley 19. This pulley 19 is carried by a shaft 20 which operates the apron of the conveyor 8 through a beveled gearing 21. However, since the conveyor 8 is old, the details thereof are not shown hereon.

Guards 22, on the support means 23 and positioned at the two ends of the unloader 3, prevent cut vegetation from getting into the chains 15 and 30. A sprocket 29 drives a belt or chain 28 which, through the chain 30, drives the feeder units 11. A shaft 24 may be provided with a sprocket wheel 25, connected by the sprocket chain 15 to shaft 25'.

Figure 4:
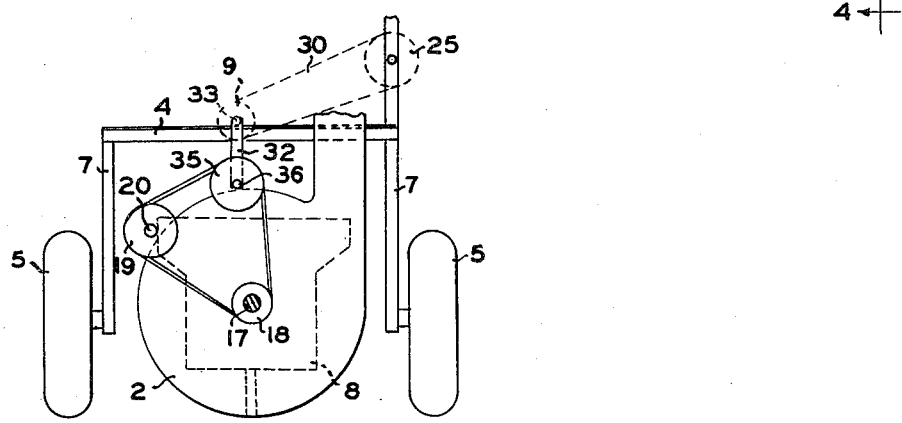
Fig. 4 is an end view of the structure shown in Fig. 3, taken substantially along the plane indicated by the line 4—4 in that figure.

In the modified form shown in Figs. 3 and 4, the pulley 19 on the shaft 20 is belted to a pulley 35 (Fig. 4) on a shaft 36 which is in turn extended through a universal joint 31 and a drive shaft 32 to a driven shaft 33 by a universal joint 34. A spring 37 (in both forms) helps to lift the conveyor 8 into upright position, and in both forms of this construction, the blower fan is driven by the shaft 17.

It is of course understood that the specific description of structure set forth above may be departed from without departing from the spirit of this invention as disclosed in this specification and as defined by the appended claims.

Having now described my invention, I claim:

1. A portable unloader for removing crops from a farm vehicle to a ground-supported hopper in a typical arrangement in which the open discharge end of the vehicle is placed proximate to and at a level above the near edge of the hopper for downward and rearward discharge into the hopper, said unloader comprising: a mobile carrier structurally independent of the vehicle and hopper and including a generally horizontal open framework positionable directly over the hopper so that crops moving from the vehicle to the hopper pass through said framework, said carrier including spaced-apart legs secured thereto and depending therefrom astride and clear of the hopper, certain of said legs having wheels thereon engaging the ground adjacent to the hopper so as to enable the carrier to be rolled into and out of a normally stationary operating position relative to the hopper and vehicle; generally vertical support means structurally independent of the vehicle and hopper and secured to and rising from the vehicle-proximate side of the framework substantially in a plane intermediate the vehicle and the near side of the hopper; rotary feeder units carried by the support means substantially in said plane for engaging and causing vehicle-carried crops to move downwardly and rearwardly to the hopper as aforesaid, power-transmitting means on the carrier and drivingly connected to the crop-engaging element, brace means extending from an upper portion of the support means and the edge of the framework remote from said support means; and shield means carried by said brace means to prevent scattering of crops by the crop-engaging means.

2. The invention defined in claim 1, including: additional shield means depending from the framework for positioning adjacent to the far edge of the hopper, said additional shield means having its upper portion adjoining the lower portion of the first-mentioned shield means for directing crops into the hopper.

3. The invention defined in claim 2, in which: the additional shield means is of such length as to enter the hopper, and said additional shield means being movably mounted to clear the hopper during positioning of the carrier.

4. The invention defined in claim 1, including: a deflector mounted on the carrier below the crop-engaging means and positionable to deflect crops over the near edge of and into the hopper.

References Cited in the file of this patent

UNITED STATES PATENTS

| | | |
|---|---|---|
| 2,340,983 | Pfeiffer et al. | Feb. 8, 1944 |
| 2,463,643 | Recker | Mar. 8, 1949 |
| 2,529,263 | Reese | Nov. 7, 1950 |

FOREIGN PATENTS

| | | |
|---|---|---|
| 165,199 | Germany | Nov. 9, 1905 |